US008391643B2

(12) United States Patent
Melbourne et al.

(10) Patent No.: US 8,391,643 B2
(45) Date of Patent: Mar. 5, 2013

(54) IMAGE REGISTRATION METHOD (75) Inventors: Andrew Melbourne, London (GB);
David Atkinson, London (GB)

(73) Assignee: UCL Business PLC, London (GB)

( * ) Notice: Subject to any disclaimer, the term of this patent is extended or adjusted under 35 U.S.C. 154(b) by 551 days.

(21) Appl. No.: 12/598,552

(22) PCT Filed: May 2, 2008

(86) PCT No.: PCT/GB2008/001520
§ 371 (c)(1),
(2), (4) Date: Apr. 8, 2010

(87) PCT Pub. No.: WO2008/135730
PCT Pub. Date: Nov. 13, 2008

(65) Prior Publication Data
US 2010/0202687 A1 Aug. 12, 2010

(30) Foreign Application Priority Data

May 3, 2007 (GB) .................................. 0708600.2

(51) Int. Cl.
*G06K 9/32* (2006.01)
(52) U.S. Cl. ......... 382/294; 382/151; 382/293; 382/128
(58) Field of Classification Search .................. 382/294, 382/151, 293, 128
See application file for complete search history.

(56) References Cited

U.S. PATENT DOCUMENTS 6,009,212 A * 12/1999 Miller et al. .................. 382/294
2004/0071367 A1* 4/2004 Irani et al. ..................... 382/284

OTHER PUBLICATIONS

Henderson et al., "Temporal Sampling Requirements for the Tracer Kinetics Modeling of Breast Disease", Magnetic Resonance Imaging, vol. 16, No. 9, Apr. 1998, pp. 1057-1073.
Tofts et al., "Estimating Kinetic Parameters From Dynamic Contrast-Enhanced $T_1$-Weighted MRI of a Diffusible Tracer: Standardized Quantities and Symbols", Journal of Magnetic Resonance Imaging, Jan. 1999, pp. 223-232.
Tanner et al., "Volume and Shape Preservation of Enhancing Lesions when Applying Non-rigid Registration to am Time Series of Contrast Enhancing MR Breast Images", Springer-Verlag Berlin Heidelberg, 2000, pp. 327-337.
Buckley, David L., "Uncertainty in the Analysis of Tracer Kinetics Using Dynamic Contrast-Enhanced T1-Weighted MRI", Magnetic Resonance in Medicine 47, Oct. 2001, pp. 601-606.
Choyke et al., "Functional Tumor Imaging With Dynamic Contrast-Enhanced Magnetic Resonance Imaging", Journal of Magnetic Resonance Imaging 17, pp. 509-520.
Rohlfing et al., "Volume-Preserving Nonrigid Registration of MR Breast Images using Free-Form Deformation With an Incompressibility Constraint", IEEE Transactions on Medical Imaging, vol. 22, No. 6, Jun. 2003, pp. 730-741.

(Continued)

*Primary Examiner* — Chan S Park
*Assistant Examiner* — Mark Roz
(74) *Attorney, Agent, or Firm* — Fulbright & Jaworski L.L.P.

(57) ABSTRACT

The present invention provides a method of registering image data for a series of images acquired over a period of time. The images may be acquired from a medical imaging device, such as an MRI scanner. The method allows image-by-image registration to a partially compressed dataset in which motion artifacts are suppressed in a series of target images generated to resemble the original dynamic data. The registration process is refined with each iteration of the process. The method uses Principal Component Analysis which allows accurate registration to be performed without the need to make any assumptions about pharmacokinetic model parameters, which not only avoids the problems of accurate model-fitting but permits the use of much larger target areas of the dataset.

4 Claims, 3 Drawing Sheets

OTHER PUBLICATIONS

Crum et al., "Anisotropic multi-scale fluid registration: evaluation in magnetic breast imaging", Institute of Physics Publishing, Physics in Medicine and Biology, 50, Aug. 2005, pp. 5153-5174.

Cuenod et al., "Tumor angiogenesis: pathophysiology and implications for contrast-enhanced MRI and CT assessment", Springer Science+Business Media, Inc., Abdom Imaging 31, Jan. 30, 2006, pp. 188-193.

Bouncers et al.; "Comparison of the Performance of Tracer Kinetic Model-Driven Registration for Dynamic Contrast Enhanced MRI Using Different Models of Contrast Enhancement", Academic Radiology, Reston, VA, US, vol. 13, No. 9, Sep. 1, 2006, pp. 1112-1123.

Acton P. D. et al.; "Registration of dynamic dopnamic dopamine D2 receptor images using principal component analysis", European Journal of Nuclear Medicine, vol. 24, No. 11, Nov. 1997, pp. 1405-1412.

Anderson A.H., et al.; "Principal Component analysis of the dynamic response measured by fMRI: A Generalized linear systems framework," Magnetic Resonance Imaging, vol. 17, No. 6, Jul. 1999, pp. 795-815.

Melbourne A., et al.; "Registration of dynamic contrast-enhanced MRI using a progressive principal component registration (PPCR)," Physics in Medicine and Biology, Taylor and Francis Ltd., London, GB, vol. 52, No. 17, Sep. 7, 2007, pp. 5147-5156.

International Search Report and the Written Opinion issued for PCT/GB2008/001520, dated Nov. 3, 2009, 15 pages.

* cited by examiner

IMAGE REGISTRATION METHOD

FIELD OF THE INVENTION

The present invention relates to a method for aligning features which change or move in a series of images taken of a particular subject over a period of time.

BACKGROUND TO THE INVENTION

Dynamic Contrast-Enhanced Magnetic Resonance Imaging (DCE-MRI) has developed into an important tool in the armoury of diagnostic imaging. The use of a contrast agent allows additional information to be obtained. If the biological uptake of the contrast agent is monitored by repeated scanning, dynamic information can be obtained that is not achievable with conventional MRI. The benefit of functional and vascular information is clear when we consider, for example, tumour angiogenesis. In many organs, such as the liver, a growing tumour will soon require a substantial blood supply and to do this it stimulates arterial growth at its boundary. This arterial growth will be both disordered and disorganised. A contrast agent in its first arterial pass through the body will flow around the tumour periphery creating a ring-shaped enhancement pattern. The under-developed blood vessels leak contrast agent and the pattern of enhancement yields quantitative information on these processes. For example, see Choyke et al.: Functional tumor imaging with dynamic contrast-enhanced magnetic resonance imaging (J Magn Reson Imaging 17(5) (May 2003) 509-520); Cuenod et al.: Tumor angiogenesis: pathophysiology and implications for contrast-enhanced MRI and CT assessment (Abdom Imaging 31(2) (2006) 188-193); and Tofts et al.: Estimating kinetic parameters from dynamic contrast-enhanced T(1)-weighted MRI of a diffusable tracer: standardized quantities and symbols (J Magn Reson Imaging 10(3) (September 1999) 223-232).

DCE-MRI often takes minutes to capture the image, which means that the patient will often move and will certainly need to breathe over the course of a scan. Registration is often needed to align images taken with the patient in different positions. Registration methods often assume that features in two images are the same, and the alignment of these features uses simple image or information based cost-functions. The assumption of recurring features cannot be made in DCE-MRI; in the simplest case differences exist between pre-contrast and post-contrast images: enhanced features such as tumour boundaries will not be present in the pre-contrast images. There have been a number of attempts at a solution to this problem.

One method restricts any registration that attempts to introduce rapid volume changes (associated with an enhancing boundary) as described by both Tanner et al. (Volume and shape preservation of enhancing lesions when applying non-rigid registration to a time series of contrast enhancing MR breast images, Lect. Notes Comput. Sc. 1935 (2000) 327-337) and Rohlfing et al. (Volume-preserving non-rigid registration of MR breast images using free-form deformation with an incompressibility constraint, IEEE Trans Med Imaging 22(6) (June 2003) 730-741).

Alternatively, Buonaccorsi et al. (Comparison of the performance of tracer kinetic model-driven registration for dynamic contrast enhanced MRI using different models of contrast enhancement, Acad Radiol 13(9) (September 2006) 1112-1123) propose an iterative registration method that allows registration of the original data to a synthetic data series. The process allows the production of more suitable target images to which to register. The synthetic data is generated by fitting the Kety pharmacokinetic model to the original data (Buckley, D. L.: Uncertainty in the analysis of tracer kinetics using dynamic contrast-enhanced t1-weighted MRI, Magn Reson Med 47(3) (March 2002) 601-606). The registered data is used to update the pharmacokinetic model, which is then used to generate the synthetic data for the next registration step. A small region of interest is used, and only rigid deformations are considered.

There is need for a method which circumvents the requirement for a model. The present invention addresses this need and provides a method which generates a synthetic time-series using data-reduction techniques. The present invention allows a large region of interest to be considered without the complications of either segmentation or multiple model-fitting.

SUMMARY OF THE INVENTION

The present invention provides a method of registering image data for a series of T original images acquired over a period of time, comprising:

carrying out a first set of three steps:

1a) performing Principal Component Analysis on the series of T original images to produce T eigenvectors $U^1_m$;

1b) generating a series of T synthetic images based on only the first of the T eigenvectors, $U^1_1$;

1c) registering each original image to its corresponding generated synthetic image to produce a second set of T images that are coarsely registered;

carrying out a second set of three steps:

2a) performing Principal Component Analysis on the second set of T images to produce a second set of T eigenvectors $U^1_m$;

2b) generating a second series of T synthetic images based on the first and second of the second set of T eigenvectors $U^2_1$ and $U^2_2$;

2c) registering each of the second set of images to its corresponding generated second synthetic image to produce a third set of T images; and carrying out an iterative process T−1 times in order to generate a final series of T well-registered images, wherein the iterative process comprises repeating the second set of three steps except that in each repeated set of three steps:

the Principal Component Analysis is performed on the previously generated set of T images, the generated synthetic images are based on a set of eigenvectors whose number increases in each iteration by an increment of one, and the previously generated set of T images is registered to the newly generated set of synthetic images.

The present invention also provides a method of registering image data, comprising applying a registration method to acquired image data, where the registration method comprises:

acquiring the image data, $A^1_{ij}$, wherein the image data comprises a dataset of pixel-functions for a series of T images acquired over a period of time, where ij is the position index of the individual pixel function within the dataset, and $A^1_{ij}$ is a vector of dimension T×1 consisting of T time points;

comparing all pixel-functions in the dataset to obtain a covariance matrix of size T×T;

determining T eigenvectors $U_m$ of the covariance matrix and ordering the eigenvectors $U_m$ by eigenvalue magnitude, where m=[1, 2, . . . , M] and M=T; and repeating the iterative process:

$$A^{n+1}{}_{ij} = A^n{}_{ij} \mapsto \sum_{m=1}^{n<M} (U^n_m \cdot A^n{}_{ij}) U^n{}_m,$$

from n=1 to n=M−1 in order to generate a final well-registered set of image data $A^T{}_{ij}$, where:
  n is the number of the iteration,
  $A^n{}_{ij}$ is the nth iteration generated dataset,
  $U^n{}_m$ is a set of nth iteration eigenvectors generated from the nth iteration generated dataset, and
  ↦ represents an image registration function.

The method may further comprise the step of displaying the final well-registered set of image data $A^T{}_{ij}$ on a display device.

The present invention also provides an apparatus for registering image data for a series of T original images acquired over a period of time, comprising:
  means for carrying out a first set of three steps:
  1a) performing Principal Component Analysis on the series of T original images to produce T eigenvectors $U^1{}_m$;
  1b) generating a series of T synthetic images based on only the first of the T eigenvectors, $U^1{}_1$;
  1c) registering each original image to its corresponding generated synthetic image to produce a second set of T images that are coarsely registered;
  means for carrying out a second set of three steps:
  2a) performing Principal Component Analysis on the second set of T images to produce a second set of T eigenvectors $U^1{}_m$;
  2b) generating a second series of T synthetic images based on the first and second of the second set of T eigenvectors $U^2{}_1$ and $U^2{}_2$;
  2c) registering each of the second set of images to its corresponding generated second synthetic image to produce a third set of T images; and
  means for carrying out an iterative process T−1 times in order to generate a final series of T well-registered images, wherein the iterative process comprises repeating the second set of three steps except that in each repeated set of three steps:
  the Principal Component Analysis is performed on the previously generated set of T images,
  the generated synthetic images are based on a set of eigenvectors whose number increases in each iteration by an increment of one, and
  the previously generated set of T images is registered to the newly generated set of synthetic images.

The present invention also provides an apparatus for registering image data, comprising:
  means for applying a registration method to acquired image data, where the registration method comprises:
  acquiring the image data, $A^1{}_{ij}$, wherein the image data comprises a dataset of pixel-functions for a series of T images acquired over a period of time, where ij is the position index of the individual pixel function within the dataset, and $A^1{}_{ij}$ is a vector of dimension T×1 consisting of T time points;
  comparing all pixel-functions in the dataset to obtain a covariance matrix of size T×T;
  determining T eigenvectors $U_m$ of the covariance matrix and ordering the eigenvectors $U_m$ by eigenvalue magnitude, where m=[1, 2, . . . , M] and M=T; and
  repeating the iterative process:

$$A^{n+1}{}_{ij} = A^n{}_{ij} \mapsto \sum_{m=1}^{n<M} (U^n_m \cdot A^n{}_{ij}) U^n{}_m,$$

from n=1 to n=M−1 to generate a final well-registered set of image data $A^T{}_{ij}$, where:
  n is the number of the iteration,
  $A^n{}_{ij}$ is the nth iteration generated dataset,
  $U^n{}_m$ is a set of nth iteration eigenvectors generated from the nth iteration generated dataset, and
  ↦ represents an image registration function.

The apparatus may further comprise a display device for displaying the final well-registered set of image data $A^T{}_{ij}$.

The images may be acquired from a medical imaging device, such as an MRI scanner. The images may be generated and stored on networked hard disk devices for use with medical imaging software packages. The images may be loaded onto local or networked hardware and analysed using the Progressive Principal Component Registration (PPCR) protocol of the present invention. Access to clustered computers for processing is preferable since it allows for reduced analysis run-time. After analysis, the registered image data may be stored on the networked or local hard disk devices and is made available for viewing on a local display device for further analysis by medical practitioners.

The present invention uses the known method of Principal Component Analysis (PCA). PCA is a method of representing data in a coordinate system so that the maximum data variance occurs along the first axis, the second largest variance component occurs along the second axis, and so on. The ordering of variance allows components that represent a large fraction of the variance of the data to be considered separately from those that contain little variance. This makes it useful both for eliciting trends from data and in compressing data. Both approaches may be useful for the registration of DCE-MRI but it is the data compression, applied in the time domain, that is used in the present invention.

To calculate principal components it is necessary to reinterpret the acquired data so that every pixel in an image is described by a function detailing its change in intensity through the dynamic sequence in the time domain. An individual pixel-function located at index i,j is denoted $A_{ij}$ and since it consists of T time points, is a vector of dimension T×1. All pixels in the dataset are compared in order to obtain a covariance matrix of size T×T. The PCA result is obtained by finding the eigenvectors of this covariance matrix and ordering the eigenvectors by eigenvalue magnitude.

The covariance matrix from which principal components are calculated is governed by the strength of temporal relationships between pixels. The mean intensity across the image will vary, but this will not contribute to the covariance values. Regions that enhance will contribute, due to changes in pixel variance. Random noise is not influenced by time-point and will appear uniformly over the covariance matrix, but time-dependent pixel trends bias the covariance matrix. This bias influences the resulting eigenvectors and eigenvalues of the covariance matrix. As a result, strong pixel time-point trends result in large eigenvalues combined with an eigenvector reflecting this trend. Ordering the eigenvectors by eigenvalue magnitude sifts long-temporal pixel trends from short-temporal random noise. If motion appears random and of similar magnitude through all time-points, such image motion artefacts will appear in principal components with small magnitude eigenvalues. Conversely, pixels undergoing different enhancement profiles will have those profiles encapsulated in combinations of the first few principal components. Such enhancement profiles may be caused by underlying physiological profiles.

The PCA produces T eigenvectors $U_m$, each of size T×1, where m=[1, 2, ..., M] and M=T. The acquired data is written in terms of these eigenvectors. Each pixel has an amount $C_{ij,m}$, of eigenvector $U_m$. $C_{ij,m}$ is the dot product of $U_m$ and the original pixel $A_{ij}$. Hence the original pixel, $A_{ij}$, located at index if can be re-built as in the following equations 1 and 2:

$$A_{ij} = \sum_{m=1}^{M} C_{ij,m} U_m \qquad (1)$$

$$A_{ij} = \sum_{m=1}^{M} (U_m \cdot A_{ij}) U_m \qquad (2)$$

It is believed that most of the signal associated with enhancement is contained in the earlier eigenvectors of the PCA. Hence a pixel's intensity value $A_{ij}$ is approximated by equation 3 in which the less significant eigenvectors are left out:

$$A_{ij} \approx \sum_{m=1}^{n<M} (U_m \cdot A_{ij}) U_m \qquad (3)$$

PCA extracts trends from the time-series data in order of significance. As a result long-term contrast-agent uptake trends should appear in the first principal component eigenvectors, whereas any short-term random motion would be represented in later principal components. If data is rebuilt from only the first few eigenvectors, as in the present invention, it is possible to register to essentially motion-free data. Having done this, the process can be repeated. The initial synthetic dataset is given by equation 4, where the star-superscript represents PCA generated data and the initial dataset is taken as the first iteration: $A_{ij}^1 = A_{ij}$. Eigenvectors are also given a superscript denoting the iteration in which they were calculated (e.g. $U_m^n$ for the nth iteration).

$$A^{1*}{}_{ij} = (U^1{}_1 \cdot A^1{}_{ij}) U^1{}_1 \qquad (4)$$

Each image in the original data, $A^1$, is then registered to its corresponding image in the PCA generated, data, $A^{1*}$ (see equation 5 where $\mapsto$ represents image registration).

$$A^2 = A^1 \mapsto A^{1*} \qquad (5)$$

The image registration is performed using a suitable non-rigid registration algorithm. This process will result in a dataset for the second iteration, $A^2$, that is coarsely registered. These steps can then be repeated to re-calculate the PCA on this coarse-registered data, $A^2$, thus giving a new set of principal component eigenvectors $U_m^2$ (where the superscript denotes that this is the second iteration). Data is then rebuilt from both the first and second eigenvectors from the new PCA (Equation 6).

$$A^{2*}{}_{ij} = (U^2{}_1 \cdot A^2{}_{ij}) U^2{}_1 + (U^2{}_2 \cdot A^2{}_{ij}) U^2{}_2 \qquad (6)$$

This step can be taken because the coarse registered data has less motion than the original data, so motion artefacts should appear even later in the principal component eigenvectors. The coarsely registered data, $A^2$, is then registered to the dataset produced by Equation 6, $A^{2*}$, to find $A^3$ (equation 7).

$$A^3 = A^2 \mapsto A^{2*} \qquad (7)$$

This process is repeated from n=[1, 2, ..., M–1] in order to achieve well-registered data (equation 8). The registration for n=M would be a registration of the registered dataset to itself, as in equation 2. This process is called Progressive Principal Component Registration (PPCR).

$$A^{n+1}{}_{ij} = A^n{}_{ij} \mapsto \sum_{m=1}^{n<M} (U_m^n \cdot A^n{}_{ij}) U^n{}_m \qquad (8)$$

The image registrations performed at each iteration may be implemented by any registration method. Due to the approach of the present invention, a large region of interest can be used. As a result, it is preferable to use a non-rigid registration method to accommodate for differences in the type and extent of motion of the subject.

BRIEF DESCRIPTION OF THE DRAWINGS

By way of example, an embodiment of the present invention will now be described with reference to the accompanying figures, in which:—

DETAILED DESCRIPTION OF THE DRAWINGS

Abdominal DCE-MRI data of the liver were acquired as follows. During image acquisition, patients were asked to hold their breath at full exhale. Image acquisition time was 2 seconds per slice, with an interval of 11 seconds between acquisitions. Approximately 40 frames were acquired for each dataset. Contrast agent was injected at approximately the 7th acquisition. Due to the length of the scan, the data is susceptible to motion, despite being acquired under repeated breath-hold by the patient. The motion in the data is predominantly a measure of the patient's breath-hold consistency. Motion is expected to be random and uncorrelated between the images within a dataset. Therefore, it is expected that the motion will be unable to strongly bias the covariance matrix.

The PPCR method described in detail in the summary of the invention was carried out on the obtained data. In addition, a simple, single registration was carried out on the first image in each dataset. The results of these two registrations were compared. Both the PPCR method and the simple, single registration method used an Euler-fluid registration process with a cross-correlation cost function to produce the results. The registration method is disclosed in Crum et al.: Anisotropic multi-scale fluid registration: evaluation in magnetic resonance breast imaging. (Phys Med Biol 50(21) (November 2005) 5153-5174). Although the results are shown for 2D image sequences, the invention can also be applied to 3D volume sequences.

The success of the registration method can be tested using a model-fitting algorithm. Significant work has been done using the extended Kety Model used by Buonaccorsi et al. (Comparison of the performance of tracer kinetic model-driven registration for dynamic contrast enhanced MRI using different models of contrast enhancement, Acad Radiol 13(9) (September 2006) 1112-1123). The standardisation and interpretation of the parameters is covered by Tofts et al. (Estimating kinetic parameters from dynamic contrast-enhanced T(1)-weighted MRI of a diffusable tracer: standardized quantities and symbols; J Magn Reson Imaging 10(3) (September 1999) 223-232) and problems with uncertainty in the model fitting are discussed by Buckley (Uncertainty in the analysis of tracer kinetics using dynamic contrast-enhanced t1-weighted MRI, Magn Reson Med 47(3) (March 2002) 601-606). In the case of the data presented here, the model can only be applied tenuously since the low temporal resolution of the data means that it is not possible to fit an accurate arterial input function to the data (Henderson, E. et al.: Temporal sampling requirements for the tracer kinetics modeling of breast disease. Magn Reson Imaging 16(9) (November 1998) 1057-1073). The slow variation in the wash-out phase can be fitted to a function such as Equation 9, which is a de-parametrised interpretation of the post-enhancement Kety model.

$$A_{ij}(t) = B_{ij} e^{-b_{ij} t} \qquad (9)$$

For each pixel $A_{ij}$, the parameters $B_{ij}$ and $b_{ij}$ can be estimated using a non-linear, least-squares fitting routine. De-parameterisation is performed in order to ensure that no assumptions are made about the underlying physiology from a poor model of the data. The result is only used to gauge registration success. It is expected that pixels that are well-registered, post-enhancement, will exhibit a monotonic variation in intensity with no rapid intensity fluctuations. This is due to redistribution of contrast-agent around the body after a finite bolus injection. In the case of poor registration, artificial artefacts cause pixel-wise intensity fluctuations that do not fit this model and the sum-of-squared-differences between the original pixel and the fitted curve provides an indication of registration error. For a successful registration, the curve-fitting is improved.

Figure 1:
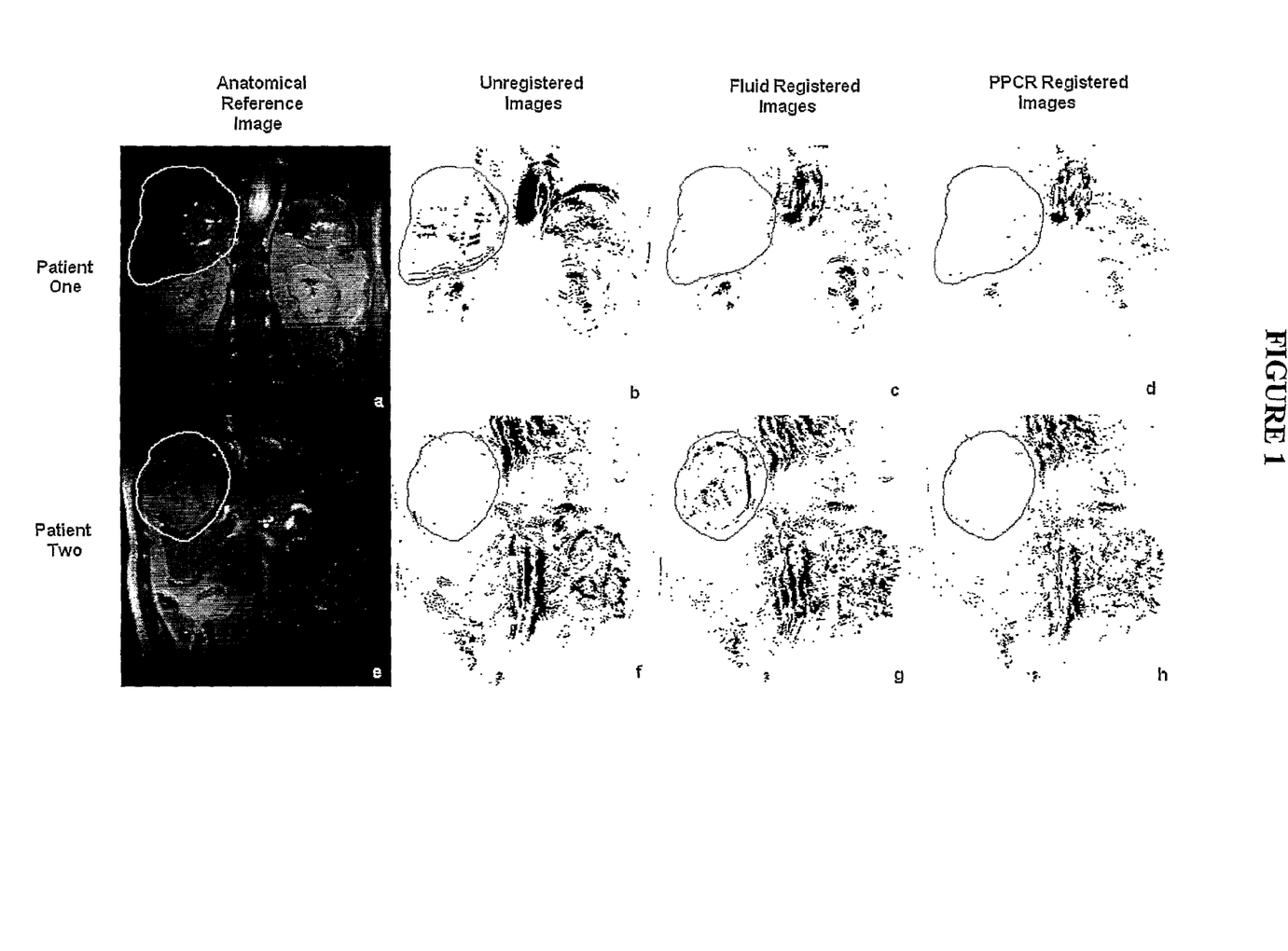
FIG. 1 shows absolute-difference images demonstrating registration failure when registration to a first image in a dataset is used, and correct registration when PPCR is used, for two post-contrast images.

FIG. 1 shows absolute-difference images demonstrating registration failure when registration to a first image in a dataset is used, and correct registration when PPCR is used, for two post-contrast images. Images a and e are anatomical images for reference. Images b and f show the no-registration case for comparison. Images c and g show the results of registration with the first image in the dataset, and images d and h show the results of registration by PPCR.

Black regions in the images indicate that there is a difference between these regions in the two images and white regions indicate that the images are closely matched.

A comparison in the case of true motion artefacts is represented in FIGS. 1a to 1d, containing motion of the liver, spleen & kidney. These are black & white difference-squared images between two different post-contrast timepoints. Dark areas are the result of motion artefacts and are often in pairs, associated with intensity differences both in front of and behind the moving organ. The registration to the first image in the sequence shows removal of much of the superior-inferior displacement artefact in the liver, but the enhancing kidney largely remains unregistered. In the case of the PPCR, a greater proportion of motion artefact is removed and the enhancing kidney does not show artificial artefacts.

Evidence for mis-registration by fluid registration is found in FIG. 1g, a subtraction of two images registered to the first image in this dataset. In the liver, FIG. 1g shows evidence of fluctuations in tumour position in the upper lateral portion of the liver: image g demonstrates artefactual tumour motion (within the drawn outline). The figure presents only the difference of two time points, but the effect repeats throughout the dataset and this would pose a serious problem for successful analysis.

Registration by Progressive Principal Component Registration (PPCR) in FIG. 1h leads to improved motion correction without the registration artefacts in FIG. 1g. Comparison with the no-registration cases shown in FIGS. 1b and f shows that motion artefacts are also reduced or removed. This is evidence that PPCR allows successful registration of DCE-MRI datasets.

A comparison in the case of true motion artefacts is represented in FIGS. 1e to h. These are absolute difference images between two different post-contrast timepoints from the same dataset as FIGS. 1a to d. The registration to the first image in the sequence shows removal of much of the superior-inferior displacement artefact in the liver, but the enhancing kidney largely remains unregistered. In the case of the PPCR, a greater proportion of motion artefact is removed and the enhancing kidney does not show artificial artefacts.

Results from 22 datasets were compared using a blind-evaluation process, the results of which are shown in table 1. An operator was presented two movies side-by-side, from a selection of three movies of a particular dataset (the unregistered images (NoReg), registration-to-first-image-in-dataset (Fluid) and registration by PPCR (PPCR)). The operator chose which movie they preferred or that they didn't have a preference. A preference is characterised by reduced motion and reduced evidence of artefacts, particularly in the liver region. A group of four operators familiar with the process of image registration, although unfamiliar with DCE-MRI of the liver, evaluated 89 movie-pairs. The scores in the table represent the number of cases of a given preference.

TABLE 1

| Reg. Type 1 | Vs | Reg. Type 2 | Undecided |
| --- | --- | --- | --- |
| NoReg | 0-28 | Fluid | 5 |
| Fluid | 0-25 | PPCR | 5 |
| PPCR | 25-0 | Original | 1 |

The results show a striking preference for the PPCR method over both the unregistered datasets and the registration to the first image in the dataset.

Figure 2:
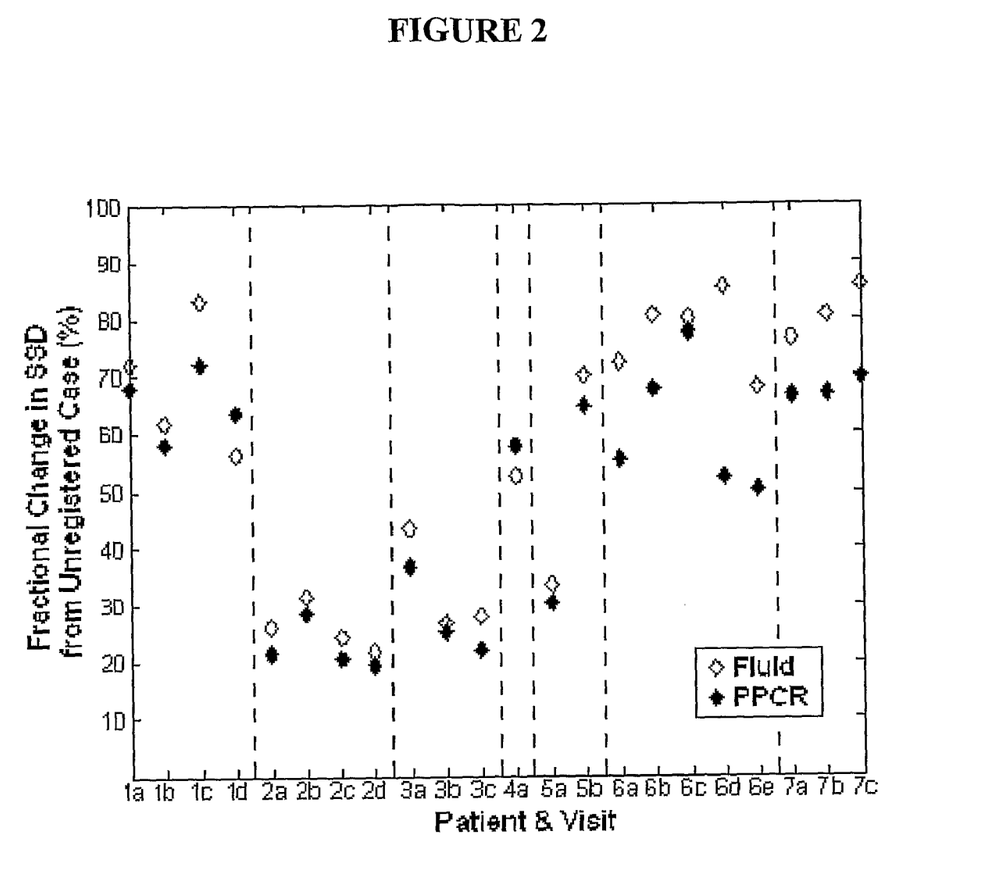
FIG. 2 shows a comparison between the results of registration to the first image in a dataset (Fluid) and registration using PPCR.

FIG. 2 shows a comparison between the results of registration to the first image in a dataset (Fluid) and registration using PPCR. The results are compared by the sum of squared differences (SSD) between time-dependent data pixels and model time-series expressed as a percentage of the SSD value relative to the unregistered case. The SSDs are generated by fitting a decaying exponential to the post-enhancement data.

FIG. 2 shows that the PPCR almost always outperforms the simple registration to first image in the dataset. The apparent success of the registration methods appears to be patient dependent: patient two appears well-registered by the simple registration case whereas for patient six, PPCR provides a significant advantage. This is due to problems with the fluid registration, which can visibly distort tumour boundaries. PPCR effectively de-couples motion induced intensity changes from contrast-enhancement induced changes, allowing a registration unencumbered by contrast-enhancement intensity variations. Registration by PPCR allows improved curve-fitting, which in principle allows superior model-fitting and physiological parameter extraction.

An advantage of the PPCR method over conventional registration is that it allows the use of information from the entire dataset to guide the image-wise deformations. In the case of DCE-MRI data, the early registrations are guided by the simplest uptake profiles and registration transformations that explain the data. This allows a registration process to take place which is refined with each iteration. The early, simple uptake profiles are expected to be relatively noise free because early principal components describe the major, long-term trends in the data. These components provide little information about the true pharmacokinetic uptake profiles of individual pixels. Although it is difficult to extract useful pharmacokinetic information from the principal components in this form, they represent a suitable way to generate intermediate data during a refining, iterative registration. Principal component sets calculated from the partially registered data are successively less likely to have random motion noise in later components and this is the justification for the use of higher components in later registrations.

The registration of DCE-MRI is complicated by the changing intensity structure of the images. Conventional image-to-image registration methods fail and produce artefacts, due to the difficulty of selecting appropriate target images. Progressive Principal Component Registration allows image-by-image registration to a partially compressed dataset in which motion artefacts are suppressed in a series of target images generated to resemble the original dynamic data. The image intensity profiles are maintained, and this is fundamental in allowing the registration to perform accurately. The use of principal components analysis allows accurate registration to be performed without the need to make any assumptions about pharmacokinetic model parameters, which not only avoids the problems of accurate model-fitting but permits the use of much larger target areas of the dataset. Therefore, PPCR is a successful method for the model-free registration of large region-of-interest DCE-MRI datasets.

The PPCR approach is especially useful in clinical trials, because it enables data that might otherwise be rejected as "bad" to be used in the quantitative analysis, reducing the overall cost of the trial.

The PPCR method has been described for use with MRI images using Gd-based contrast agents. The method is also applicable to other dynamic imaging modalities, including other types of MRI, and PET, CT and ultrasound using any suitable tracers or contrast agents. Furthermore, for imaging methods that involve successive acquisition of images with different contrast properties (such as diffusions imaging), the present invention may be used to correct for motion of the subject between these successive acquisitions.

The PPCR method is also applicable to other pathologies where contrast agents or tracers are used, such as assessment of synovitis in rheumatoid arthritis, and to imaging organs, including the brain, heart, lungs and joints.

The PPCR method is based on the use of principle component analysis. The PCA is used to reconstruct artifact-free images for use in image registration. Other techniques, such as independent component analysis (ICA) could also be used for this purpose.

The PPCR method may also have application to the identification of voxels that can be used for the automated determination of the arterial input function (AIF), due to the distinctive temporal response of the blood vessels or other tissues from which the AIF is to be determined.

Once the PPCR method has been applied to the acquired data, the voxels for the measurement of an arterial input function (AIF), if required, can be delineated, and subsequent pharmacokinetic model fitting can be used to derive parameters such as $K_{trans}$ and IAUC(t) (Initial Area Under the Curve: the area under the signal-time curve over a defined period of time, t, e.g. 60 second) on a voxel-by-voxel basis or region of interest basis. The accuracy of both the AIF and the pharmacokinetic parameters will be improved by the effective application of the PPCR method.

The PPCR method of the present invention is appropriate for registration of images with varying contrast, and the method can be used to correct motion and scanner eddy current distortions in Diffusion Weighted MRI of the brain.

In particular, the PPCR method may also be applied to Diffusion Weighted MM. Patient motion and eddy current distortions in the images from different diffusion directions often cause a spatial mis-alignment of Diffusion Weighted MR images, reducing the success of subsequent analysis such as tractography. These types of artefact can potentially be reduced by image registration, provided that a suitable registration scheme can be found. Features such as fibre tracks appear in multiple images with contrast dependent upon diffusion gradient direction. This changing contrast can confound standard registration techniques producing inaccurate results. The PPCR scheme of the present invention uses a principal components analysis to automatically generate a target image and makes use of overlapping contrast information in the images from different gradient orientations to perform the registration.

Figure 3:
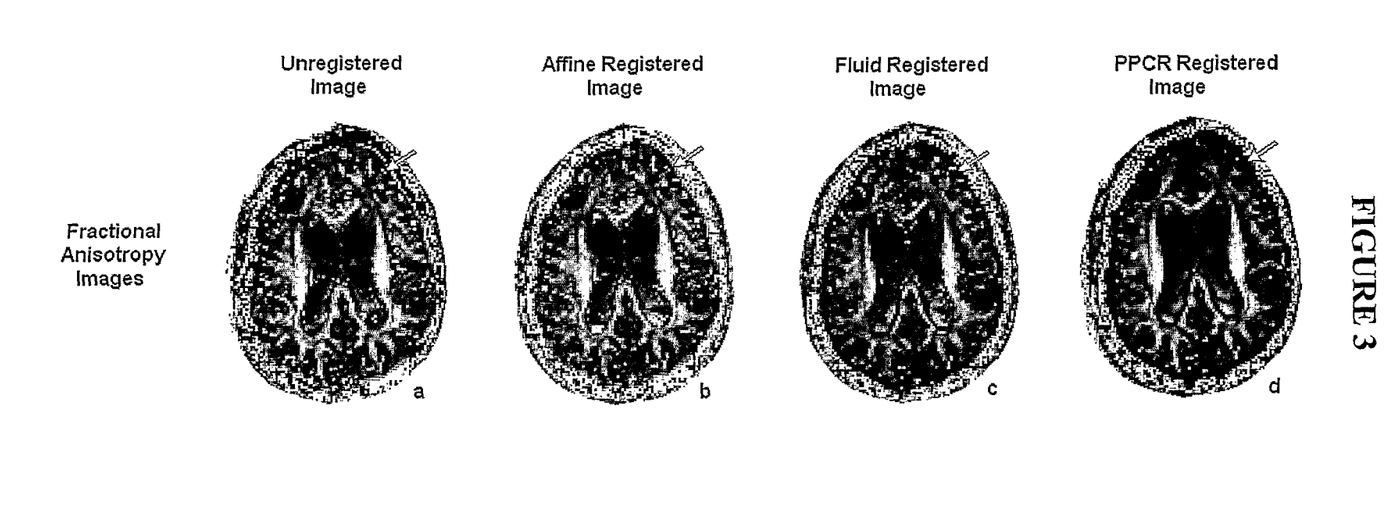
FIG. 3 shows the results of the PPCR method of the present invention when applied to a slice within one dataset of Diffusion Weighted MR Images of the brain.

FIG. 3 shows the results of the PPCR method applied to a slice within one brain dataset. Data from fifteen diffusion directions was combined to produce fractional anisotropy maps (FIGS. 3a to 3d). A comparison was made between the unregistered diffusion data, an affine registration of each diffusion direction volume, a direct fluid registration of each diffusion direction volume and the PPCR method of the present invention applied to the diffusion direction data.

The unregistered data demonstrate significant motion between diffusion directions that, when combined to produce fractional anisotropy maps, produce the blurring shown in FIG. 3a. The blurring is labelled with an arrow in the anterior brain, but can be seen throughout the image. Successive registration methods allow improved generation of fractional anisotropy maps and sharper feature detection in this region. The PPCR method is superior to the affine and direct fluid registration methods shown here.

The PPCR method allows non-rigid registration of diffusion weighted MR images. The use of the PPCR method allows registration of different diffusion directions, with differing contrasts, into a common coordinate frame by combining overlapping image information from different orientations into early principal components. The process allows enhanced feature demarcation after further analysis (e.g. fractional anisotropy as shown and potentially tractography) by removing spatial mis-alignments.

It will be appreciated that the embodiment and results discussed above have been described by way of example only, and that alterations or modifications may be made within the scope of the invention as defined by the claims.

The invention claimed is:

1. A method of registering image data for a series of T original images acquired over a period of time, comprising:
   carrying out a first set of three steps:
   1a) performing Principal Component Analysis on the series of T original images to produce T eigenvectors $U^1_m$;
   1b) generating a series of T synthetic images based on only the first of the T eigenvectors, $U^1_1$;
   1c) registering each original image to its corresponding generated synthetic image to produce a second set of T images that are coarsely registered;
   carrying out a second set of three steps:

2a) performing Principal Component Analysis on the second set of T images to produce a second set of T eigenvectors $U^1_m$;
2b) generating a second series of T synthetic images based on the first and second of the second set of T eigenvectors $U^2_1$ and $U^2_2$;
2c) registering each of the second set of images to its corresponding generated second synthetic image to produce a third set of T images; and carrying out an iterative process T−1 times in order to generate a final series of T well-registered images, wherein the iterative process comprises repeating the second set of three steps except that in each repeated set of three steps:

the Principal Component Analysis is performed on the previously generated set of T images, the generated synthetic images are based on a set of eigenvectors whose number increases in each iteration by an increment of one, and the previously generated set of T images is registered to the newly generated set of synthetic images.

2. The method of claim 1, further comprising the step of displaying the final well-registered set of image data $A^T_{ij}$ on a display device.

3. An apparatus for registering image data for a series of T original images acquired over a period of time, comprising:

means for carrying out a first set of three steps:
1a) performing Principal Component Analysis on the series of T original images to produce T eigenvectors $U^1_m$;
1b) generating a series of T synthetic images based on only the first of the T eigenvectors, $U^1_1$;
1c) registering each original image to its corresponding generated synthetic image to produce a second set of T images that are coarsely registered;

means for carrying out a second set of three steps:
2a) performing Principal Component Analysis on the second set of T images to produce a second set of T eigenvectors $U^2_m$;
2b) generating a second series of T synthetic images based on the first and second of the second set of T eigenvectors $U^2_1$ and $U^2_2$;
2c) registering each of the second set of images to its corresponding generated second synthetic image to produce a third set of T images; and means for carrying out an iterative process T−1 times in order to generate a final series of T well-registered images, wherein the iterative process comprises repeating the second set of three steps except that in each repeated set of three steps:

the Principal Component Analysis is performed on the previously generated set of T images, the generated synthetic images are based on a set of eigenvectors whose number increases in each iteration by an increment of one, and the previously generated set of T images is registered to the newly generated set of synthetic images.

4. The apparatus of claim 3, and further comprising a display device for displaying the final well-registered set of image data $A^T_{ij}$.

* * * * *